(12) United States Patent
Frye et al.

(10) Patent No.: US 11,873,249 B2
(45) Date of Patent: Jan. 16, 2024

(54) METHOD TO FORM ALIGNED INTERFACE COATING ON SILICON CARBIDE FIBERS

(71) Applicant: Raytheon Technologies Corporation, Farmington, CT (US)

(72) Inventors: Asa Frye, Lagrangeville, NY (US); Cristal Chan, East Hampton, CT (US); Daniel L. Becerra, West Hartford, CT (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 17/738,314

(22) Filed: May 6, 2022

(65) Prior Publication Data

US 2023/0357093 A1 Nov. 9, 2023

(51) Int. Cl.
| | |
|---|---|
| *C04B 35/565* | (2006.01) |
| *C04B 35/583* | (2006.01) |
| *C04B 35/80* | (2006.01) |
| *C04B 41/45* | (2006.01) |
| *C04B 41/87* | (2006.01) |

(52) U.S. Cl.
CPC ........ *C04B 41/4584* (2013.01); *C04B 35/565* (2013.01); *C04B 35/583* (2013.01); *C04B 35/80* (2013.01); *C04B 41/4531* (2013.01); *C04B 41/87* (2013.01); *C04B 2235/386* (2013.01); *C04B 2235/3826* (2013.01); *C04B 2235/5244* (2013.01)

(58) Field of Classification Search
CPC . C04B 41/4584; C04B 35/565; C04B 35/583; C04B 35/80; C04B 41/4531; C04B 41/87; C04B 2235/3826; C04B 2235/386; C04B 2235/5244
See application file for complete search history.

(56) References Cited

U.S. PATENT DOCUMENTS

| | | |
|---|---|---|
| 5,134,020 A | 7/1992 | Cotteret et al. |
| 9,708,226 B2 | 7/2017 | Lazur |
| 2022/0055957 A1* | 2/2022 | Shim ...................... C04B 41/89 |

OTHER PUBLICATIONS

B. Bender, et al., "Effect of Fiber Coatings and Composite Processing on Properties of Zirconia-Based Matrix SiC Fiber Composites", from 838 American Ceramic Society Bulletin 65 Jan. 1986, No. 2, 7 pages.

Extended European Search Report for EP Application No. 23171683.8, dated Oct. 13, 2023, 10 pages.

F. Rebillat, et al., "Oxidation Resistance of SiC/SIC Micro and Minicomposites with a Highly Crystallised in BM Interphase", from Journal of the European Ceramic Society 18 (1998), pp. 1809-1819.

R. Naslain, et al., "Boron Nitride Interphase in Ceramic-Matrix Composites" , from J. Am. Ceram. 74 (1991), pp. 2482-2488.

(Continued)

*Primary Examiner* — Karl E Group
*Assistant Examiner* — Cameron K Miller
(74) *Attorney, Agent, or Firm* — Kinney & Lange, P.A.

(57) ABSTRACT

A fibrous ceramic preform includes a plurality of ceramic fibers, a first amorphous layer, and an interfacial coating layer. The interfacial coating layer includes an anisotropic region adjacent the at least one amorphous layer, and an isotropic region on a side of the anisotropic region opposite the at least one amorphous layer.

16 Claims, 3 Drawing Sheets

(56) References Cited

OTHER PUBLICATIONS

S. Jacques, et al., "SiC/SiC minicomposites with structure-graded BN interphases", from Journal of European Ceramic Society 20, (2000), pp. 1929-1938.
S. Le Gallet, et al., "Microstructural and microtextural investigations of boron nitride deposited from BC13—NH3—H2 gas mixtures", from Journal of the European Ceramic Society 24 (2004), pp. 33-44.

* cited by examiner

METHOD TO FORM ALIGNED INTERFACE COATING ON SILICON CARBIDE FIBERS

BACKGROUND

The present invention relates to ceramic matrix composites, and more particularly to the formation of interface coatings therein.

Fiber-reinforced ceramic matrix composites (CMCs) are known and used for components that are exposed to high temperatures and corrosive conditions that can degrade other kinds of materials. Under such severe conditions, such as the operating conditions in aerospace and aircraft applications, even such ceramic materials are vulnerable to degradation. Over time, ceramic materials can form microcracks that further expose the ceramic material to oxygen or other corrosive elements, which form undesirable phases to the detriment of the properties of the ceramic matrix composite component.

Fibers can be coated with a single layer of boron nitride to form a weak interface between the fibers and matrix material to enable desired composite characteristics. However, boron nitride can sometimes form with a disordered structure that readily oxidizes and exhibits diminished capacity for arresting and deflecting of cracks. Therefore, composites based on such interfaces can lack sufficient durability and/or fracture toughness. Thus, interface materials with a greater oxidation resistance are desirable.

SUMMARY

A fibrous ceramic preform includes a plurality of ceramic fibers, a first amorphous layer, and an interfacial coating layer. The interfacial coating layer includes an anisotropic region adjacent the at least one amorphous layer, and an isotropic region on a side of the anisotropic region opposite the at least one amorphous layer.

A method of forming a ceramic matrix composite includes forming a fibrous ceramic preform by arranging a plurality of ceramic fibers, depositing a first amorphous layer, and depositing an interfacial coating layer such that it is influenced by the first amorphous layer. The interfacial coating layer includes an anisotropic region adjacent and promoted by the first amorphous layer, and an isotropic region on a side of the anisotropic region opposite the first amorphous layer.

Figure 1:
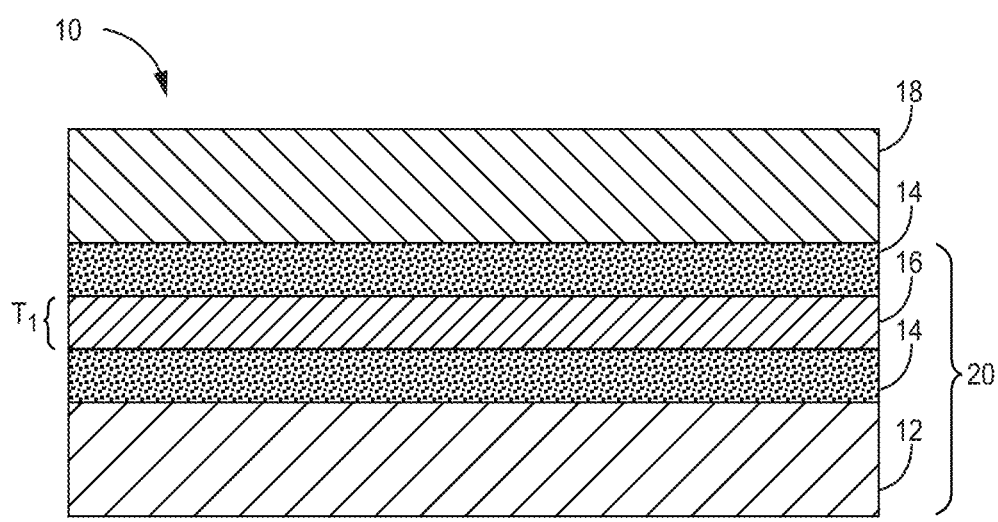
FIG. 1 is a schematic cross-sectional view of a CMC component showing a fiber coating system.

While the above-identified figures set forth one or more embodiments of the present disclosure, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features and components not specifically shown in the drawings.

DETAILED DESCRIPTION

This disclosure presents a CMC component with an ordered and aligned interface coating (IFC) layer and a method of forming such a component. At least one layer of an amorphous material and an IFC layer are applied to a fibrous preform. The amorphous material promotes alignment of basal planes of hexagonal boron nitride (h-BN) of the IFC layer in the direction of the preform fibers. The aligned boron nitride (BN) imparts improved fracture toughness and oxidation resistance to the CMC.

FIG. 1 is a simplified cross-sectional view showing a fiber coating system for CMC component 10. Component 10 can be, for example, a component suitable for use in a gas turbine engine. Component 10 includes a plurality of ceramic fibers 12, although only one is depicted in FIG. 1. At least one amorphous layer 14 and at least one IFC layer 16 (only one is depicted in FIG. 1) can be disposed between fiber 12 and ceramic matrix 18. Fiber 12 and layers 14 and 16 can represent a net-shape or near net-shape preform 20. Fibers 12 can be formed from bundled silicon carbide (SiC) tows and arranged in various woven or non-woven unidirectional or multidirectional architectures. Other suitable ceramic fibers are contemplated herein. Individual fibers have a lengthwise, major dimension disposed along a longitudinal fiber axis. Woven architectures in particular may include multiple, offset longitudinal fiber axes, albeit falling within a common plane of the fabric or layer.

Amorphous layer(s) 14 can be formed from materials forming generally amorphous (i.e., non-crystalline or glassy) solids. The material used should generally not be detrimentally reactive with respect to the SiC fibers or other surrounding layers. Exemplary materials within an amorphous layer 14 can include one or a combination of oxygen (i.e., for forming oxides), carbon, silicon, boron, and nitrogen. Although two amorphous layers 14 are shown in FIG. 1, an alternative embodiment could include a single amorphous layer 14 in either position (e.g., between fiber 12 and IFC layer 16, or between IFC layer 16 and matrix 18), or a third amorphous layer 14, especially if an additional IFC layer 16 is included. An individual amorphous layer 14 can be on the order of 20 nm to 250 nm, and 20 nm to 30 nm in an exemplary embodiment. IFC layer(s) 16 can be formed from a boron-based material such as BN or silicon boron nitride (SiBN). The positioning of an IFC layer 16 with respect to an amorphous layer 14 is such that a respective IFC layer 16 will be immediately adjacent and in physical contact with an amorphous layer 14 in order to promote order within the IFC layer 16 as is discussed in greater detail below. An individual IFC layer 16 can also be on the order of 150 nm to 1000 nm, and 200 nm to 400 nm in an exemplary embodiment, with a total thickness represented as $T_1$. Ceramic matrix 18 can be formed from SiC, like fibers 12, and is shown as an outermost/upper layer in FIG. 1, although ceramic matrix 18 will generally also infiltrate pores of preform 20 for through-thickness application.

Figure 2:
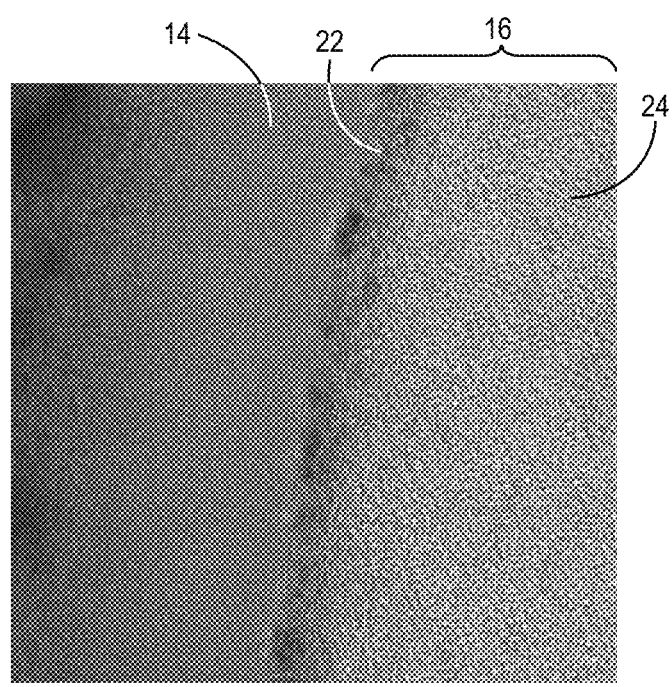
FIG. 2 is a high-resolution transmission electron microscopy (TEM) image providing a cross-sectional view of a portion of an interfacial coating and amorphous layer of the fiber coating system; scale bar is 10 nm.

FIG. 2 is a high-resolution magnified view of a portion of amorphous layer 14 and IFC layer 16 as captured by TEM. As shown in FIG. 2, IFC layer 16 includes anisotropic region 22 and isotropic region 24. Anisotropic region 22 can alternatively be referred to as a relatively "more ordered" or "more aligned" region, while isotropic region 24 can alternatively be referred to as a relatively "less ordered" or "less aligned" region, for the reasons discussed below. Anisotropic region 22 is disposed immediately adjacent amorphous layer 14 with isotropic region 24 on a side of anisotropic region 22 opposite amorphous layer 14. In an embodiment with an amorphous layer 14 on either side of an IFC layer 16, such as is shown in FIG. 1, IFC layer 16 can include a distinct anisotropic region 22 bordering each amorphous layer 14, with an isotropic region 24 therebetween.

Anisotropic region 22 can be characterized as having a more ordered/aligned microstructure than isotropic region 24. More specifically, anisotropic region 22 exhibits a more crystalline three-dimensional structure of h-BN oriented such that the basal planes (i.e., planes of covalently bonded B and N atoms) align in a direction parallel to a longitudinal fiber axis, and are further aligned with respect to one another. Such alignment is promoted by the adjacent amorphous layer 14. Isotropic region 24 can have a generally less ordered/aligned microstructure as compared to anisotropic region 22, for example, exhibiting more turbostratic characteristics with reduced alignment among basal planes. An individual anisotropic region 22 can have a thickness that is 5% to 100% the total thickness $T_1$ of IFC layer 16. In one embodiment, such as the embodiment shown in FIG. 2, the thickness of anisotropic region 22 can be about 5% to 15% the total thickness $T_1$ of IFC layer 16. In an embodiment in which the thickness of anisotropic region 22 is equal to $T_1$, there is no appreciable isotropic region 24 present, such that IFC layer 16 is made up of anisotropic region 22. Generally speaking, the greater the thickness of anisotropic region 22, the better the benefits (e.g., improved toughness and/or oxidation resistance) conferred to component 10. Additionally, and as indicated by the anisotropic and isotropic labels, anisotropic region 22 can have direction-dependent properties (e.g., mechanical, physical, thermal, and electrical) and isotropic region 24 can have direction independent properties.

Figure 3:
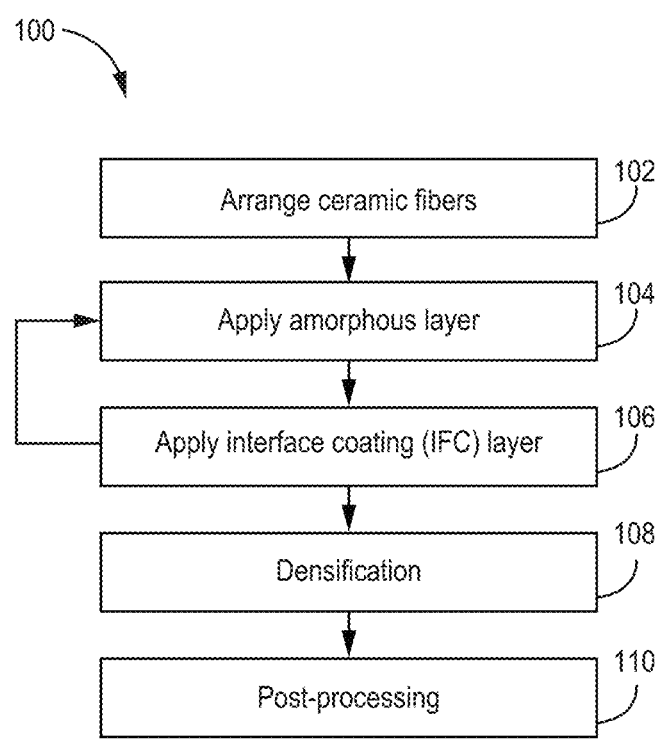
FIG. 3 is a flowchart illustrating a method of forming the CMC component of claim 1.

FIG. 3 is a flow chart illustrating select steps of method 100 for forming a CMC component, such as component 10, with the coating system discussed above with respect to FIGS. 1 and 2. At step 102, fibers 12 can be arranged (i.e., as fabric plies, braids, tapes, etc.) in a layered stacking arrangement in a planar manner or laid-up on tooling to create preform 20, depending on the geometry of the desired final component.

At step 104, amorphous layer 14 can be applied to fibers 12 via a deposition process, such as chemical vapor infiltration (CVI). Other processes suitable for coating aerospace components are contemplated herein. A "layer" as used herein can represent a single or multiple rounds/passes of deposition depending on the desired thickness of the layer. In some cases, step 104 can be carried out in stages with step 102, for example, to individual fiber layers during preforming, or can be carried out on a net shape or near net shape preform.

At step 106, IFC layer 16 can be applied. As with amorphous layer 14, IFC layer 16 can be applied via CVI. In some embodiments, steps 104 and 106 will be carried out once preform 20 is placed in the reaction chamber, just prior to the densification step (108). An IFC "layer" 16 can include material from a single or multiple rounds of deposition. If multiple amorphous layers 14 and/or IFC layers 16 are desired, steps 104 and 106 can be repeated as necessary.

At step 108, preform 20 can undergo matrix formation and densification using CVI. During densification, the layers of fibers 12 are infiltrated by reactant vapors, and a gaseous precursor deposits on the fibers. Densification can be carried out until the resulting CMC has reached the desired residual porosity.

At step 110, various optional post-processing steps can be performed, such as the application of one or more protective coatings (e.g., environmental and/or thermal barrier coatings). A bond coat can also be applied to facilitate bonding between the CMC and a protective coating. Other protective coatings, especially those suitable for use in a gas turbine engine environment, are contemplated herein.

In an operational environment, CMC component 10 can be subjected to high temperature oxidation. BN IFC materials have been used to stabilize the fiber-matrix interface under such conditions. The presence of the ordered BN within anisotropic region(s) 22 does not oxidize as readily and can better arrest and deflect cracks away from the underlying fiber structure. A CMC component formed with the disclosed fiber coating system can be incorporated into aerospace, maritime, or industrial equipment, to name a few, non-limiting examples.

DISCUSSION OF POSSIBLE EMBODIMENTS

The following are non-exclusive descriptions of possible embodiments of the present invention.

A fibrous ceramic preform includes a plurality of ceramic fibers, a first amorphous layer, and an interfacial coating layer. The interfacial coating layer includes an anisotropic region adjacent the at least one amorphous layer, and an isotropic region on a side of the anisotropic region opposite the at least one amorphous layer.

The preform of the preceding paragraph can optionally include, additionally and/or alternatively, any one or more of the following features, configurations and/or additional components:

In the above preform, the first amorphous layer can be deposited on the plurality of ceramic fibers, and the interfacial coating layer can be deposited on the first amorphous layer such that the first amorphous layer is disposed between the plurality of ceramic fibers and the interfacial coating layer.

In any of the above preforms, the interfacial coating layer can be deposited on the plurality of ceramic fibers, and the first amorphous layer can be deposited on the interfacial coating layer, such that the interfacial coating layer is disposed between the plurality of ceramic fibers and the first amorphous layer.

Any of the above preforms can further include a second amorphous layer.

In any of the above preforms, the first amorphous layer can be deposited on the plurality of ceramic fibers, the interfacial coating layer can be deposited on the first amorphous layer, and the second amorphous layer can be deposited on the interfacial coating layer on a side opposite the first amorphous layer.

In any of the above preforms, the plurality of ceramic fibers can be formed from silicon carbide.

In any of the above preforms, the first amorphous layer can include one or a combination of oxygen, carbon, silicon, boron, and nitrogen.

In any of the above preforms, the interfacial coating layer can include boron nitride, and the anisotropic region of the interfacial coating layer can include hexagonal boron nitride.

In any of the above preforms, the hexagonal boron nitride can be aligned with an axis of the plurality of ceramic fibers.

In any of the above preforms, the axis can be a longitudinal axis of the plurality of ceramic fibers.

In any of the above preforms, the interfacial coating layer can have a first thickness, and the anisotropic region can have a second thickness ranging from 5% to 100% of the first thickness.

A ceramic matrix composite can include any of the above preforms and a silicon carbide matrix formed upon the preform, the interfacial coating layer being disposed between the ceramic matrix and the plurality of ceramic fibers.

The above ceramic matrix composite can further include at least one of an environmental barrier coating and a thermal barrier coating.

A method of forming a ceramic matrix composite includes forming a fibrous ceramic preform by arranging a plurality of ceramic fibers, depositing a first amorphous layer, and depositing an interfacial coating layer such that it is influenced by the first amorphous layer. The interfacial coating layer includes an anisotropic region adjacent and promoted by the first amorphous layer, and an isotropic region on a side of the anisotropic region opposite the first amorphous layer.

The method of the preceding paragraph can optionally include, additionally and/or alternatively, any one or more of the following features, configurations and/or additional components:

In the above method, at least one of the step of depositing the first amorphous layer and depositing the interfacial coating layer can include chemical vapor infiltration.

In any of the above methods, the first amorphous layer can be deposited on the plurality of ceramic fibers, and the interfacial coating layer can be deposited on the first amorphous layer such that the first amorphous layer is disposed between the plurality of ceramic fibers and the interfacial coating layer.

In any of the above methods, the interfacial coating layer can be deposited on the plurality of ceramic fibers, and the first amorphous layer can be deposited on the interfacial coating layer such that the interfacial coating layer is disposed between the plurality of ceramic fibers and the first amorphous layer.

Any of the above methods can further include depositing a second amorphous layer.

In any of the above methods, the first amorphous layer can be deposited on the plurality of ceramic fibers, the interfacial coating layer can be deposited on the first amorphous layer, and the second amorphous layer can be deposited on the interfacial coating layer on a side opposite the first amorphous layer.

Any of the above methods can further include densifying the fibrous ceramic preform using chemical vapor depositing to deposit a matrix of silicon carbide.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:
1. A fibrous ceramic preform comprising:
   a plurality of ceramic fibers;
   a first amorphous layer deposited on each of the plurality of ceramic fibers; and
   a boron-based interfacial coating layer deposited on the first amorphous layer such that the first amorphous layer of each of the plurality of ceramic fibers is disposed between a respective one of the plurality of ceramic fibers and the respective interfacial coating layer, each of the interfacial coating layers comprising:
      an anisotropic region adjacent the first amorphous layer, the anisotropic region comprising hexagonal boron nitride; and
      an isotropic region on a side of the anisotropic region opposite the first amorphous layer.

2. The preform of claim 1 and further comprising: a second amorphous layer.

3. The preform of claim 2, wherein the first amorphous layer is deposited on the plurality of ceramic fibers, the interfacial coating layer is deposited on the first amorphous layer, and the second amorphous layer is deposited on the interfacial coating layer on a side opposite the first amorphous layer.

4. The preform of claim 1, wherein the plurality of ceramic fibers are formed from silicon carbide.

5. The preform of claim 1, wherein the first amorphous layer comprises one or a combination of oxygen, carbon, silicon, boron, and nitrogen.

6. The preform of claim 1, wherein the interfacial coating layer comprises boron nitride, and wherein the anisotropic region of the interfacial coating layer comprises hexagonal boron nitride.

7. The preform of claim 6, wherein the hexagonal boron nitride is aligned with an axis of the plurality of ceramic fibers.

8. The preform of claim 7, wherein the axis is a longitudinal axis of the plurality of ceramic fibers.

9. The preform of claim 1, wherein the interfacial coating layer has a first thickness, and wherein the anisotropic region has a second thickness ranging from 5% to 100% of the first thickness.

10. A ceramic matrix composite comprising:
    the preform of claim 1; and
    a silicon carbide matrix formed upon the preform, wherein the interfacial coating layer is disposed between the ceramic matrix and the plurality of ceramic fibers.

11. The ceramic matrix composite of claim 10 and further comprising: at least one of an environmental barrier coating and a thermal barrier coating.

12. A method of forming a ceramic matrix composite, the method comprising:
    forming a fibrous ceramic preform by:
       arranging a plurality of ceramic fibers;
       depositing a first amorphous layer on each of the plurality of ceramic fibers; and
       depositing a boron-based interfacial coating layer on the first amorphous layer such that it is influenced by the first amorphous layer and further such that that the first amorphous layer of each of the plurality of ceramic fibers is disposed between a respective one of the plurality of ceramic fibers and the respective interfacial coating layer, the interfacial coating layer comprising:
          an anisotropic region adjacent and promoted by the first amorphous layer, the anisotropic region comprising hexagonal boron nitride; and
          an isotropic region on a side of the anisotropic region opposite the first amorphous layer.

13. The method of claim 12, wherein at least one of the step of depositing the first amorphous layer and depositing the interfacial coating layer comprises chemical vapor infiltration.

14. The method of claim 12 and further comprising: depositing a second amorphous layer.

15. The method of claim 14, wherein the first amorphous layer is deposited on the plurality of ceramic fibers, the interfacial coating layer is deposited on the first amorphous layer, and the second amorphous layer is deposited on the interfacial coating layer on a side opposite the first amorphous layer.

16. The method of claim 12 and further comprising: densifying the fibrous ceramic preform using chemical vapor depositing to deposit a matrix of silicon carbide.

* * * * *